Patented Oct. 17, 1922.

1,432,633

UNITED STATES PATENT OFFICE.

CLARENCE S. STEVENS, OF SHEBOYGAN, AND CARL A. BAUMANN, OF JEFFERSON, WISCONSIN, ASSIGNORS, BY MESNE ASSIGNMENTS, TO CARNATION MILK PRODUCTS COMPANY, OF CHICAGO, ILLINOIS, A CORPORATION OF DELAWARE.

MILK PRODUCT.

No Drawing.      Application filed June 30, 1917.   Serial No. 177,859.

*To all whom it may concern:*

Be it known that we, CLARENCE S. STEVENS and CARL A. BAUMANN, citizens of the United States, and residents, respectively, of Sheboygan, in the county of Sheboygan, and of Jefferson, in the county of Jefferson, and State of Wisconsin, have invented certain new and useful Improvements in Milk Products, of which the following is a true and complete specification.

The invention relates to milk products, and has for its objects to provide a new food product, composed of animal milk from which butter fat has been extracted, and vegetable oils, from which the free fatty acids have been removed, whereby the high value of butter fat may be utilized separate from the milk, and the lower priced vegetable oils may be made palatable and available as foods.

More particularly, the object of our invention is to provide a product of excellent flavor, and at the same time provide a process that is inexpensive and practical.

The invention is carried out by a series of steps, so selected as not to injure the constituents of the milk after butter fat has been extracted from whole cow's milk, and it also is intended to retain all the valuable constituents of such skimmed milk during the various steps of the process, and also it brings about a permanent stable emulsion of such skimmed milk with the substituted fat or fats added to replace the extracted butter fat.

In carrying out our process and producing our improved product, we proceed in the following manner:

Animal milk, for instance, cow's milk, is subjected to any well-known process for the removal of butter fat, so far as is practical. This removal may be done by any suitable mechanical separator of a type that is well known, and it is preferable to carry this separation to as high a degree as possible, so that as much of the high-value butter fat may be available for separate sales, as deemed necessary.

The whole milk from which butter fat has been extracted, is then conveyed to collecting, or storage, vats. From the storage vats, certain amounts of this skimmed milk are conducted to preheating vats, where the skimmed milk is subjected to a suitable heating, and this preheating brings the skimmed milk to a temperature suitable for the quick receptivity for any added oil or fats, the object of this preheating being to save the longer time which would otherwise be necessary to heat the milk in the vacuum pan before the process of evaporation begins.

A further object is to avoid heating the fat in the preheaters, which object is accomplished by adding the fat in the vacuum pan.

After the skimmed milk is raised to this temperature, it is conveyed to the vacuum pans through the operation of the suction produced in the vacuum pan, and when a suitable quantity of this heated skimmed milk is in the vacuum pan, it is ready to be subjected to the evaporation process therein. The amount of the skimmed milk charged in the vacuum pan has been previously determined beforehand, relative to its weight, so as to have a predetermined quantity in the pan.

One form of our invention consists in adding to the skimmed milk in the vacuum pan, before any evaporation whatever takes place, a vegetable fat of a predetermined quantity, and refined and free from free fatty acids, which is ascertained by weighing the fat in a certain proportion relative to the weight of the skimmed milk to be condensed.

The fat or oils may be refined on the premises, or may be obtained refined and free from free fatty acids, it being important that care be taken in this particular. In this form of our invention, the fat is added before any evaporation takes place, and then after the predetermined quantity of fat has been added to the predetermined quantity of skimmed milk, then the evaporation process is started and carried out to the desired degree of condensation.

By this method, the skimmed milk and the fat are immediately and simultaneously subjected to the action of the evaporation process in the vacuum pan, so that immediately both are subjected to the agitation resulting therefrom, and at the same time both are subjected to the action of the heat coils and of the vacuum in the vacuum pan. Of course, only a certain amount of water in the skimmed milk is evaporated at first, but the vacuum pan action acts simultaneously in conjunction with the steam coils on the mixture and subjects it to a thorough intermingling, during which time a certain portion of the water is removed, and during which operation the intermingling of the fat with the skimmed milk and the partially condensed skimmed milk becomes very thorough and intimate.

As the evaporation of the water is continued, the mixture is successively re-formed by virtue of the water being evaporated, while all the fat remains, which fat gradually becomes more intimate with a less amount of the skimmed milk, as the skimmed milk is reduced in quantity by evaporation of its original water content. We believe this to be due to the fact that the fat and the successively reduced partially skimmed milk is maintained during this operation in the vacuum pan at approximately the same temperature. This operation also renders the skimmed milk receptive to the fat, and renders the casein of the skimmed milk susceptible to an intimate joinder with the fat. This operation is carried on until the condensation of the mixture arrives at the desired degree. Thereupon the mixture is conveyed to homogenizers at the vacuum pan temperature, and is homogenized in these homogenizers in successive small quantities, at certain predetermined pressures, preferably two to three thousand pounds. The mixture is then rapidly cooled, and then canned, and sterilized, and may then be mechanically shaken back into liquid cream-like form. Up to the sterilization, the emulsion is in a liquid condition. In the sterilizer, however, the emulsion in the cans may be brought to jelly-like consistency, and then shaken from this jelly-like consistency back into liquid cream-like form by well-known mechanical shakers.

Another form of our invention consists in following out the above process until the skimmed milk is sucked into the vacuum pan. This skimmed milk of predetermined quantity is then partially condensed, and when a certain degree of condensation has been reached, then the fat is added. After the fat has been added, the condensation is then continued up to its predetermined state of condensing. Hence, it is clear that in this embodiment, the fat is added during the condensation in the vacuum pan. Thereafter, the process is carried out as above described.

Instead of adding all the fat at one time to the partially condensed skimmed milk in the vacuum pan during the process of the condensation of the skimmed milk, the fat may be added successively in small quantities from the beginning of the evaporation process during the time the skimmed milk is in the vacuum pan until towards the end of the evaporation process. In this embodiment of the invention, the mixture is subjected to the evaporation process for a short time, after the last fat has been added. This modification of this second embodiment also adds the fat during the condensation of the skimmed milk in the vacuum pan.

In carrrying out the above second embodiment of our invention, the fat may be added in bulk or solid, in its original state directly into the vacuum pan, in a manner similar to the first embodiment above described, but the fat may be added also in liquid state, in both embodiments, which results from a slight heating of the fat to change it from bulk or solid to liquid condition after being received in commercial state.

In the second embodiment, the fat may be sucked into the vacuum pan by the action of the vacuum therein, either as a complete charge, as described in connection with the second embodiment above set forth, or it may be sucked in successive small quantities, as described in the modification of the second embodiment.

The fat that we use is free from fatty acids, when it is either in its solid state, or when liquefied, and it is important to have it free from free fatty acids, and one object of the invention in the process described is to so manipulate this fat in respect to the skimmed milk that no free fatty acids are re-formed, and that the fats, when mixed with the milk, remain in substantially the same neutral condition, i. e., free from free fatty acids, in which the fats were when received, and when added to the milk.

In case liquid fat is used, the fat may be in a vat, adjacent the vacuum pan, and connected therewith by suitable pipes, or the fat is preferably conveyed directly from a closed vessel under exclusion of air and light into the vacuum pan.

The vegetable oils that have been referred to may be corn oil, cottonseed oil, olive oil, cocoanut oil, sesame oil, oil from the soy bean, arachic oil or blends thereof, all refined and free from free fatty acids, and all having highly nutritious qualities, and we have found particularly advantageous results in connection with the use of edible cocoanut oil. These oils may be combined as the taste or their constituents dictate, and then subjected to either of the processes above described.

On a further embodiment of our invention, the operations above described in the various embodiments are carried out under free from air and light, and partial vacuum conditions. For this purpose, the apparatus, from the first one to the last of the devices, are closed, and arranged so that light and air are inaccessible to the contents of the receptacles. All these vessels in which the fats or oils are contained, whether with or without milk, are subjected to a partial vacuum. Access of air or light may, under certain conditions, have the effect of causing the formation of free fatty acids, and to prevent this, this described method is proposed.

After the emulsion has been evaporated to cream-like consistency during the predetermined time, it is conducted to a collecting vat and agitation maintained therein and then homogenized at substantially the vacuum pan temperature under exclusion of air and light, then it is rapidly cooled, free from air and light, then canned, sterilized and mechanically shaken.

The products obtained from either of the processes described may be used for many of the purposes to which evaporated whole milk is put. By the processes described in the product obtained, processes are proposed which are very simple in their operation, and very efficient, because the fat is immediately mixed with the heated skimmed milk or the partially condensed skimmed milk in the vacuum pan while it is in the pans, whereby a very thorough mixing of the fat with the skimmed milk is assured. The product itself is characterized by its pleasing flavor, the taste resembling closely that of evaporated whole milk, without the detection of the added fat. This we believe to be due to the fact that no free fatty acids are capable of being formed during the carrying out of the process, the presence of which free fatty acids would render the product rancid and of bad taste and unmarketable. We believe our product to have an exceptionally good taste, and to remain a stable and permanent emulsion.

In another embodiment of our invention we do not heat the milk in the preheating vat up to the coagulating point of albumin, that is, we keep the temperature below the coagulating point of albumin.

We have described the various phases of our invention to enable those skilled in the art to understand the same, and it is clear that in the specific processes described as the embodiments of our invention, changes may be made without departing from the spirit of our invention as defined in appended claims.

Having fully described our invention, we claim as new, and desire to secure by Letters Patent:

We claim:

1. The process herein described which consists in condensing milk substantially devoid of butter fat and successively adding to the milk small parts of an edible vegetable fat at different times during the condensation of the milk.

2. The process herein described, which consists in subjecting milk from which butter fat has been extracted to condensation, and adding, during said condensation, an edible vegetable fat free from free fatty acids.

3. The process herein described, which consists in subjecting to condensation milk from which butter fat has been extracted, adding an edible vegetable fat free from free fatty acids, after the milk has been partially condensed, and thereafter subjecting the partially condensed skimmed milk, and the added fat, to a further condensation.

4. The process herein described, which consists in heating milk from which butter fat has been extracted and subjecting the same to condensation, and adding, during said condensation an edible vegetable fat, then homogenizing the emulsion and rapidly cooling the homogenized emulsion.

5. The herein described product which consists of a permanently stable emulsion composed of homogenized milk from which the butter fat has been extracted and an edible vegetable fat free from free fatty acids and containing the uncoagulated albumin of the milk.

6. The process herein described which consists in heating milk from which butter fat has been extracted to condensation, and adding during the condensation an edible vegetable fat, then homogenizing the emulsion, cooling the homogenized emulsion, and then sterilizing it, all under exclusion of light and air, and without free fatty acid formation.

In testimony, that we claim the foregoing as our invention, we have signed our names in presence of two subscribing witnesses.

CLARENCE S. STEVENS,
CARL A. BAUMANN.

Witnesses:
AGNES Y. COUGAN,
MAE M. WEINBERG.